US008767732B2

(12) United States Patent
Wu et al.

(10) Patent No.: US 8,767,732 B2
(45) Date of Patent: Jul. 1, 2014

(54) METHOD AND APPARATUS FOR SUB-CHANNEL AND POWER ALLOCATION AMONG MULTICAST SESSIONS OF A MULTICAST SYSTEM USING AN ORTHOGONAL FREQUENCY DIVISION MULTIPLE ACCESS SCHEME

(75) Inventors: Mingquan Wu, Princeton Junction, NJ (US); Hang Liu, Yardley, PA (US); Saurabh Mathur, Monmouth Junction, NJ (US); Kagan Bakanoglu, New York, NY (US)

(73) Assignee: Thomson Licensing, Boulogne-Billancourt (FR)

( * ) Notice: Subject to any disclaimer, the term of this patent is extended or adjusted under 35 U.S.C. 154(b) by 217 days.

(21) Appl. No.: 13/138,530

(22) PCT Filed: Mar. 5, 2009

(86) PCT No.: PCT/US2009/001439
§ 371 (c)(1),
(2), (4) Date: Aug. 31, 2011

(87) PCT Pub. No.: WO2010/101553
PCT Pub. Date: Sep. 10, 2010

(65) Prior Publication Data
US 2011/0317607 A1 Dec. 29, 2011

(51) Int. Cl.
*H04L 12/28* (2006.01)
*H04L 12/56* (2006.01)
*H04L 12/18* (2006.01)
*H04L 29/06* (2006.01)

(52) U.S. Cl.
CPC .......... *H04L 47/806* (2013.01); *H04L 12/1881* (2013.01); *H04L 65/4076* (2013.01); *H04L 47/15* (2013.01)

USPC ......... 370/390; 370/437; 455/452.1; 709/226

(58) Field of Classification Search
None
See application file for complete search history.

(56) References Cited

U.S. PATENT DOCUMENTS

| 2007/0115813 | A1* | 5/2007 | Hyon et al. | 370/229 |
| 2007/0268900 | A1* | 11/2007 | Park et al. | 370/390 |

OTHER PUBLICATIONS

Ngo et al., "Efficient Resource Allocation for OFDMA Multicast Systems with Fairness Consideration", Radio and Wireless Symposium, 2009, IEEE, Jan. 18, 2009, pp. 392-395.*
Ngo et al., "Efficient Resource Allocation for OFDMA Mulicast Systems with Fairness Consideration", Radio an Wireless Symposium, 2009, IEEE, Jan. 18, 2009, pp. 392-395.
Shen et al., "Adaptive Resource Allocation in Multiuser OFDM Systems with Proportional Rate Constraints", IEEE Transactions on Wireless Communications, vol. 4, No. 6, Nov. 6, 2005, pp. 2716-2737.
Search Report Dated Dec. 3, 2009.

\* cited by examiner

*Primary Examiner* — Khoa Huynh
(74) *Attorney, Agent, or Firm* — Robert D. Shedd; Jerome G. Schaefer (57) ABSTRACT

A method and apparatus are described including assigning sub-channels to different multicast sessions under the assumption that in each session all sub-channels are allocated to all users of that session and power is equally allocated to each sub-channel, then for each session assigning the sub-channels to the users of that session under the assumption that the same amount of power is allocated to each sub-channel, then allocating remaining power to certain sub-channels within the session to increase multicast rate, finally modifying the sub-channel allocations among the multicast sessions depending on the sub-channel and power allocation within each multicast session.

6 Claims, 7 Drawing Sheets

METHOD AND APPARATUS FOR SUB-CHANNEL AND POWER ALLOCATION AMONG MULTICAST SESSIONS OF A MULTICAST SYSTEM USING AN ORTHOGONAL FREQUENCY DIVISION MULTIPLE ACCESS SCHEME

This application claims the benefit, under 35 U.S.C. §365 of International Application PCT/US2009/001439, filed Mar. 5, 2009, which was published in accordance with PCT Article 21(2) on Sep. 10, 2010 in English.

FIELD OF THE INVENTION

The invention relates to wireless multicast communications generally and, in particular, to resource allocation for multiple multicast sessions and to sub-channel and power allocations for wireless multicast communications using an orthogonal frequency division multiple access (OFDMA) scheme for any given multicast session.

BACKGROUND OF THE INVENTION

In multicast/broadcast applications, data are transmitted from a server or base station (BS) to multiple receivers over wired and/or wireless networks. Herein, a "/" is used to indicate alternative names for the same or similar components. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

Resource allocation for unicast in OFDMA systems has been widely studied. Compared with unicast, resource allocation for multicast in OFDMA systems has not drawn much attention. However, multimedia applications are bandwidth demanding and unicast does not scale well. As a result, multicast is going to play an important role in such applications. In prior art resource allocation schemes for multicast systems, the multicast rate has been defined as the total throughput of the system. In prior art solutions, though multiple users can receive data from one sub-channel, there is no concept of multicast group among which users can receive the same data from a multicast application, this resulted in high rates to some users and corresponding low rates to other users. Furthermore, supplying different rates to different users leads to a fairness issue among users. Although, the prior art captured fairness to some extent, instantaneous fairness is not guaranteed for each channel realization. As a result, prior art schemes resulted in low common data rate and lack of fairness among users.

In the present invention it is assumed in a wireless multicast application, the multicast data needs to be received reliably by all users who join the multicast group. The multicast rate is the minimum data rate that can be received by all the users. Thus, a goal of the resource allocation scheme of the present invention is to maximize the multicast rate in a wireless OFDMA communication system.

The method of the present invention takes a two-step approach to solve the resource allocate problem. In the first step, sub-channel allocation is found using a low complexity suboptimal method assuming equal power is allocated to all sub-channels. In the second step, power allocation, which can also be interpreted as bit loading, is found using another low complexity suboptimal algorithm.

SUMMARY OF THE INVENTION

Orthogonal frequency-division multiple access (OFDMA) is based on the orthogonal frequency-division (OFDM) modulation scheme. OFDMA exploits the frequency selective property of a wireless communication channel by allocating sub-channels to individual users/clients/nodes/station (STAs)/mobile devices/mobile terminals/client devices. Resource allocation for OFDMA for unicast has been widely studied. The present invention describes resource allocation for multicast systems in OFDMA based wireless networks. Conventional multicast systems suffer from bad channel conditions. In order to combat bad channel condition, resource allocation is utilized with channel feedback.

OFDMA access technology is expected to play an important role in the next generation wireless communication systems. The next generation wireless communication systems are being designed for high quality multimedia support such as mobile audio/video multicast/broadcast. In a multicast/broadcast system, a group of users need to receive the same content at the same bit rate. In an OFDMA system, when a certain number of sub-channels are allocated to a multicast/broadcast application, the channel gains for each sub-channel to different users in the multicast group are different. If each member of the multicast group is required to receive data transmitted by all the sub-channels reliably, the transmission data rate on a sub-channel has to accommodate the user that has the worst channel gain on that sub-channel. To improve bandwidth efficiency, the present invention divides the users in a multicast group into subgroups based on their sub-channel gains. The method of the present invention then allocates sub-channels to each subgroup. A bit loading method for power allocation on each sub-channel is also described.

The present invention maximizes the multicast rate by performing resource allocation with a power constraint as well as considering fairness among users. A two-step approach is used on the problem. The two-step approach separates sub-channel allocation and power allocation. A greedy method is described for sub-channel allocation and a bit loading method is described and used to allocate power to sub-channels.

The two-step approach is discussed first and applied to a single multicast session. The present invention is then extended to include multiple multicast sessions by providing for a resource management method/scheme for multiple multicast sessions. In the resource management method allocates sub-channels to different multicast groups and then uses the power and sub-channel allocation method discussed first by applying that method to each of the multicast sessions allocated by the resource management method.

A method and apparatus are described including selecting one of a plurality of multicast sessions having a minimum proportional multicast rate, allocating one of the plurality of sub-channels to one of a plurality of multicast group clients for the selected multicast session, performing bit loading for the allocated sub-channel and adjusting the sub-channel allocation responsive to the second allocating act and the bit loading.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

A multicarrier multicast network is considered with a BS and K users. The communication links between the BS and the users are assumed to be frequency selective and composed of N independent parallel sub-channels. Sub-channel gains between the BS and each user are available to the BS and all users. The BS has a short term power budget $P_T$. The problem solved by the present invention is how to allocate the sub-channels to the users and power to the sub-channels adaptively in order to maximize the instantaneous multicast rate.

The following definitions/notations are used herein:

K: is the number of the users.

N: is the number of the sub-channels.

$P_T$: is the total power of the BS.

$h_{n,k}$: is the channel gain of the sub-channel n for user k.

BER: is the maximum allowed bit error rate. This is the quality of service (QoS) requirement of an application. For an example, a bit error rate above this value will impact a viewer's experience of a video streaming program.

g(BER,P): is the function that calculates/determines the number of the bits that can be transmitted at a given BER and at a given received power P.

M: is the maximum number of bits that can be transmitted in one sub-channel.

$b_{n,k}$: is the number of the bits that can be received in sub-channel n by user k. $b_{n,k}$=min(g(BER,$P_T h_{n,k}$/N),M) is the number of bits that can be reliably received by user k in sub-channel n when the BS allocates equal power ($P_T$/N) to all sub-channels.

$A_n$: is the set of users which is allocated to the sub-channel n.

$\overline{A_k}$: is the set of sub-channels which is allocated to the user k.

$c_n$: is the number of the bits that can be transmitted in sub-channel n to all users where $$c_n = \min_{k \in A_n} b_{n,k}$$

$w_{n,k}$: is a binary indicator which is 1 if sub-channel n is allocated to user k and 0 otherwise.

$R_k$: is the total rate for user k.

R: is the multicast rate where $$R = \min_k R_k$$

Let $w_{n,k}$ be the binary indicator showing that if user k is utilizing the sub-channel n or not, and it is expressed as:

$$w_{n,k} = \begin{cases} 1, & \text{if subchannel } n \text{ is allocated to user } k \\ 0, & \text{otherwise} \end{cases} \quad (1)$$

Defining $c_n$ as the number of bits assigned to the sub-channel n, it is assumed that $c_n$ is chosen from the discrete set $c_n \in C=\{1, 2, \ldots, M\}$ where M is the maximum number of bits that can be transmitted in one sub-channel. Let $R_k$ be the data rate of user k, where $$R_k = \sum_{n=1}^{N} c_n w_{n,k}.$$

Define R as the minimum of the received bit rates among all users, that is:

$$R = \min_k R_k \quad (2)$$

As will be shown below, R is the achievable multicast rate by all members/users in the multicast group. It should be noted that the multicast rate definition of the present invention is different from that conventionally used.

Let f($c_n$,BER) be the required power for a user with unity channel gain to receive $c_n$ bits with bit error rate BER. The parameter BER, which determines the Quality of Service (QoS) requirements of a multicast application, is introduced. The transmission power allocated to the sub-channel n, $P_n$, can be stated as:

$$P_n = \max_k \frac{f(c_n, BER) w_{n,k}}{h_{n,k}^2} \quad (3)$$

$P_n$ is the maximum power required to decode $c_n$ bits with bit error rate BER among assigned users.

An optimization problem is formulated in order to maximize the multicast data rate under a power constraint:

$$\max_{c_n, w_{n,k}} R \quad (4)$$

Subject to $$\sum_{n=1}^{N} P_n \leq P_T \quad (5)$$

It should be noted that all sub-channels are not necessarily allocated to all users. Some sub-channels are allocated to only some users. On the other hand, in each channel realization, the present invention ensures that all users receive at least the same multicast rate R. As used herein channel or sub-channel realization is the configuration of the channels or sub-channels. That is, the configuration of the allocation of users to sub-channels and sub-channels to users.

The above optimization problem can be solved by nonlinear integer programming. The optimum solution of this problem requires joint power and sub-channel allocations. The complexity depends on the number of sub-channels and users and is NP-hard. Instead, the present invention is a low complexity suboptimal method, which separates the sub-channel allocation and power allocation problems. First, sub-channel allocation is performed assuming constant power is allocated to each sub-channel. Second, power allocation is performed given the sub-channel allocation from first step.

A. Sub-Channel Allocation

It is assumed while solving the sub-channel allocation portion of the problem that the same amount of power $P_T/N$ is allocated to each sub-channel. Then the problem expressed in equation (4) can be written as:

$$\max_{c_n, w_{n,k}} \min_k \sum_{n=1}^{N} c_n w_{n,k} \quad (6)$$

Subject to $$\frac{f(c_n, BER) w_{n,k}}{h_{n,k}^2} \leq P_T/N \quad \forall n, k \quad (7)$$

Let g(BER,P) be the function which calculates/determines the number of bits that can be received with bit error rate BER and received power P. The function g(BER,P) is determined by the modulation type. Let $b_{n,k}$ be the number of bits that can be received by user k over sub-channel n. Then, $b_{n,k}$, which is an element of the set $\{1, 2, \ldots, M\}$ can be stated as $$b_{n,k} = \min\left(g\left(BER, \frac{P_T h_{n,k}^2}{N}\right), M\right) \quad (8)$$

The minimum term in equation (8) ensures that the maximum number of the bits in one sub-channel is not greater than M.

Define the sets $$A_n = \{k | w_{n,k} = 1, \text{ for } k=1, \ldots, K\} \quad (9)$$

$$\overline{A}_k = \{n | w_{n,k} = 1, \text{ for } n=1, \ldots, N\} \quad (10)$$

Let $A_n$ be the set of users which are assigned to sub-channel n where n=1, . . . , N and $\overline{A}_k$ be the set of sub-channels which are allocated to the user k for k=1, . . . , K. Then the number of bits $c_n$ in sub-channel n can be written as $$c_n = \min_{k \in A_n} b_{n,k} \quad (11)$$

The minimum term in equation (11) is used because the number of the bits that can be received by the selected users of sub-channel n is determined by the minimum bits that are received among all users that are assigned to sub-channel n. Then the optimization problem in equation (6) can be written as $$\max_{w_{n,k}} \min_k \sum_{n=1}^{N} b_{n,k} w_{n,k} \quad (12)$$

where $b_{n,k}$ is given in equation (8). Note that the only variable in equation (12) is then $w_{n,k}$. This is because once $w_{n,k}$ is determined, $A_n$ can be determined and equation (11) can be used to determine/calculate $c_n$.

1) Optimum Sub-Channel Allocation

A brute force optimum solution to the problem of expressed in equation (12) is described next. There are $2^{K*N}$ possible combinations of the sub-channel allocations, $w_{n,k}$. However, there are some sub-channel allocations which are unnecessary to search. Consider the number of bits that can be received by user k over sub-channel n, $b_{n,1}, b_{n,2}, \ldots, b_{n,K}$. Without loss of generality assume that $b_{n,i}$ are ordered in descending order. A clever way of allocating sub-channels is to first allocate the sub-channel n to the first user with $b_{n,1}$ which is the highest number of bits that can be received by one user. A second possibility is to allocate the sub-channel n to both the first and the second user which have the two highest $b_{n,k}$ and so on. For multicast, each user can listen on all sub-channels, there is no point in allocating the sub-channel to one user without allocating it to the user with a greater $b_{n,k}$. Yet another and Applicants believe the last possible allocation is to allocate sub-channel n to all users. Hence, for each sub-channel, there are K possible allocations. Thus, there are $K^N$ possible combinations of sub-channel allocations. However, the complexity of this algorithm still increases exponentially with the number of users and sub-channels. Thus the optimal solution is practical only when the numbers of users and sub-channels are small.

2) Least Sub-Channel Gain Allocation

Least sub-channel gain allocation is the conventional multicast transmission scheme. In this allocation scheme, all sub-channels are allocated to all users. The sub-channel allocation matrix is $w_{n,k}=1$ for all $n\in\{1,\ldots,N\}$ and $k\in\{1,\ldots,K\}$. Since all sub-channels are allocated to all users, in each sub-channel the number of bits that can reliably transmitted to all users is determined by the least sub-channel gain of all users. The multicast rate can thus be written as $$R = \sum_{n=1}^{N} \min_k b_{n,k} \quad \forall k \in \{1, \ldots, K\}$$

3) Suboptimal Sub-Channel Allocation

The suboptimal sub-channel allocation method of the present invention can be described in a pseudo-code as follows:

1. Initialization
   a) Set $w_{n,k} = 0$ for all $n \in \{1, \ldots, N\}$ and $k \in \{1, \ldots, K\}$
   b) Set $A_n(j) = \{\ \}$ and $\overline{A}_k(j) = \{\ \}$ and $j = 1$
   c) R(j) = 0
2. While $A_n(j) \neq \{1, \ldots, K\}$ for all $n \in \{1, \ldots, N\}$    a) Find $S = \{k \mid k = \arg\min_k R_k\}$ -continued b) If |S| > 1 i. Find $(n^*, k^*) = \underset{n,k}{\operatorname{argmax}} \, b_{n,k}$ for all $k \in S$ and    $n \in \{1, \ldots, N\} \backslash \overline{A_k}(j)$    ii. Update $w_{n^*,k^*} = 1$ c) Else    i. $k^* = k \in S$    ii. Find $n^* = \underset{n \in \{1, \ldots, N\} \backslash \overline{A_k}(j), w_{n,k^*} = 1}{\operatorname{argmax}} R$    iii. Update $W_{n^*,k^*} = 1$ d) Find $k^{**}$ satisfying $b_{n^*,k^{**}} > b_{n^*,k^*}$ for $k \in \{1, \ldots, K\} \backslash A_n(j)$ e) Update $A_{n^*}(j+1) = A_{n^*}(j) \cup \{k^*, k^{**}\}$,
$\overline{A_{k^*}}(j+1) = \overline{A_{k^*}}(j) \cup \{n^*\}$, $\overline{A_{k^{}}}(j+1) = \overline{A_{k^{}}}(j) \cup \{n^*\}$, f) Update $R(j+1) = \underset{k}{\min} R_k$ g) Set $j = j + 1$ 3. Find $i^*$ such that $R(i^*) = \underset{1 \le i \le j}{\max} R(i)$, then $A_n(i^*)$ and $\overline{A_k}(i^*)$ specifies our sub-channel allocation scheme and $R(i^*)$ is our achievable multicast rate.

In step 1 the method of the present invention is initialized. Setting $w_{n,k}$ equal to 0 for all users (k) and all sub-channels (n) effectively clears any sub-channel allocations. That is, no sub-channels are allocated to any users. Sets $A_n$ and $\overline{A_k}$ for all n and k are set to empty (null). j represents the number of iteration, and R(j) represents the multicast rate achievable at iteration j. Initially j is set to 1 and R(j) is set to 0.

In step 2, the method of the present invention enters the sub-channel allocation phase. This part of the method of the present invention iterates multiple times. In each iteration, one sub-channel is allocated to one or more clients/users. The method repeats the process until all sub-channels are allocated to the all users, which is the least sub-channel gain allocation scheme, where all users receive data on all sub-channels, and for each sub-channel the number of bits that can be reliably transmitted to all users is determined by the least sub-channel gain of all users. It should be noted that the multicast rate is updated and stored at each iteration, the sub-channel allocation scheme is also stored at each iteration. The reason is that the multicast rate does not always increase. It usually increases to a local maxima, and then the multicast rate starts decreasing until a local minima is reached. Thus, the method of the present invention tries to catch the highest local maximum, which is the global maximum in some cases.

In step 2a, the user which has the smallest rate is located/determined/found. In step 2b, if there is more than one user have the smallest rate, then the user and sub-channel pair with highest $b_{n,k}$ (bit rate—number of bits that can be received over sub-channel n by user k) is found among the unallocated sub-channels to these users. Then, that sub-channel is allocated to found/located user. This is especially true for the first iteration when the received bit rates for all users are 0. In step 2c, if there is only one user that has the smallest rate, the sub-channel that has not been assigned to this user and can achieve the highest multicast rate for this multicast session if it is allocated to this user, is allocated to this user. This is accomplished by searching through all the sub-channels that have not been assigned to this user and attempting/trying to assign each of the sub-channels to this user. This may cause the received bit rate of this user to increase and the received bit rate of some other users to decrease. Each time the multicast rate is calculated and recorded for comparison. In step 2d, when sub-channel n is allocated to user k with $b_{n,k}$, sub-channel n is also allocated to the users with higher $b_{n,k}$s if there are any. The reason for this allocation is that users with higher $b_{n,k}$ are able to receive $b_{n,k}$ bits in sub-channel n reliably. Sub-channel n can be allocated to these users without decreasing the number of data bits that can be allocated to this sub-channel.

In step 3, the algorithm finds out the iteration that achieves the highest multicast rate, the sub-channel allocation scheme for that iteration is selected the sub-channel allocation scheme for the algorithm.

Figure 1:
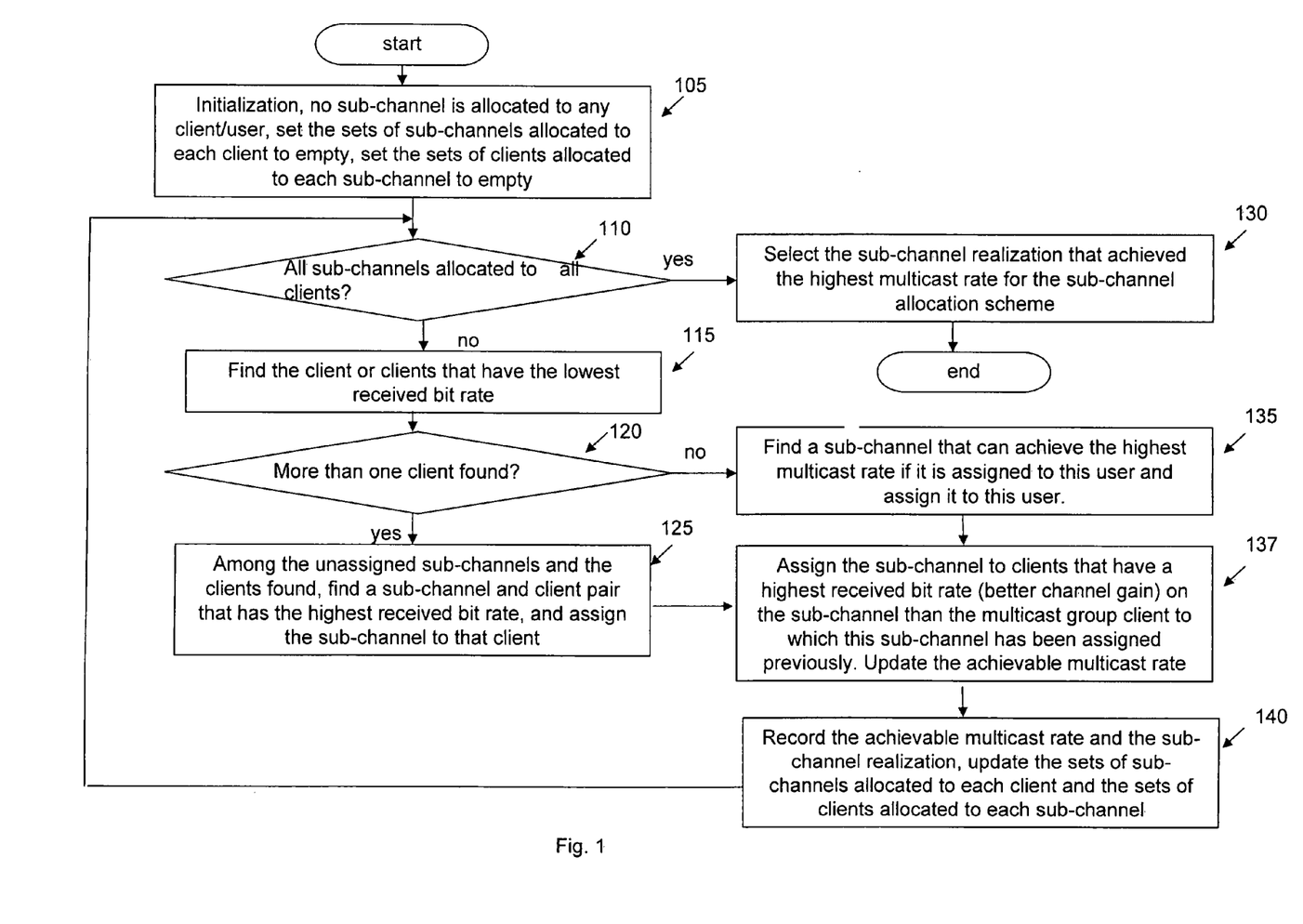
FIG. 1 is a flowchart of the sub-channel allocation portion of the method of the present invention.

FIG. 1 is a flowchart of the sub-channel allocation portion of the method of the present invention. The sub-allocation portion of the method of the present invention is determined assuming equal power on/for each sub-channel. At 105, initialization is performed. During initialization sub-channel allocations are cleared. That is no sub-channel is allocated to any user/client. The set of sub-channels allocated to each client is set to empty/null and the set of clients allocated to each sub-channel is set to empty/null. A test is performed at 110 (start of the working part/portion of the sub-channel allocation portion of the method of the present invention) to determine if all sub-channels have been allocated to all users/clients. If all sub-channels have not been allocated to all users/clients, then at 115 the client or clients are located/found that has the lowest received bit rate. A test is then performed at 120 to determine if more than one client was found/located that has the same lowest bit rate. If more than one client was found/located that has the same lowest bit rate then at 125, among the unassigned sub-channels and the clients found, a sub-channel and client pair that has the highest received bit rate is found/located and the located sub-channel of the sub-channel and client pair is assigned to the client of the located sub-channel and client pair. If more than one client was not found/located that has the same lowest bit rate, then at 135 the sub-channel that can achieve the highest multicast rate, if it is assigned to the user/client with the lowest received bit rate, is located/found and assigned to the user with the lowest received bit rate. At 137, the selected sub-channel is assigned to clients that have a higher receiving bit rate (better channel gain) on the selected sub-channel than the client to which this sub-channel had been assigned. The achievable multicast rate for the multicast session is updated. At 140 the multicast rate and the sub-channel realization/configuration is recorded. The set of sub-channels allocated to each user and the set of users allocated to each sub-channel are updated. Processing then proceeds to 110. If all sub-channels have been allocated to all users/clients, then the sub-channel allocation scheme that achieved the highest multicast rate is selected as the sub-channel allocation scheme for the algorithm at 130.

It is now shown that the bit rate R is the achievable multicast rate, that is, every client can receive R bits of multicast data per OFDMA symbol. Let $R_{sum}$ be the sum of bits that all the sub-channels transmit per OFDMA symbol, $$R_{sum} = \sum_{n=1}^{N} c_n$$

It can be shown that $R_{sum} \ge R$. If $R_{sum} = R$, which means all sub-channels are allocated to all clients. In this case, R bits multicast data are separated and allocated to different sub-channels, where sub-channel n is allocated $c_n$ bits, each client listens on all sub-channels and receive R bits of multicast data. If $R_{sum} \geq R$, a coding scheme such as Reed Solomon code $RS(R_{sum}, R)$, can be used. In this case, R bits multicast data is coded into $R_{sum}$ bits. $R_{sum}$ coded bits are separated and allocated to different sub-channels, where sub-channel n is allocated $c_n$ bits. As each client can receive R bits reliably, every client can recover R bits original multicast data.

B. Bit Loading (Power Allocation)

Now, the power allocation (bit loading) of the method of the present invention is described. The power allocation (bit loading) portion of the method of the present invention allocates bits to the sub-channels. The bit loading problem for a given sub-channel allocation, $w_{n,k}$, can be expressed as $$\max_{c_n} \min_k \sum_{n=1}^{N} c_n w_{n,k}$$

subject to $$\sum_{n=1}^{N} \frac{f(c_n, BER)}{\overline{h}_{n,k}^2} \leq P_T$$

where $\overline{h}_{n,k}^2$ is the minimum $h_{n,k}^2$ such that $w_{n,k}=1$.

In order to solve this problem, another iterative method is used. This method (portion of the method of the present invention) evaluates the power allocation and the corresponding bits, $c_n$, allocated to all sub-channels. In the sub-channel allocation portion of the method of the present invention, equal power allocation, $P_T/N$, was assumed for all sub-channels. Note that, in each sub-channel, $c_n$ bits are transmitted. The transmitted bits are chosen from a discrete set. Since a discrete set of bits are used, some amount of power is unused or unnecessary to allocate. Let $P_{residual}$ denote the sum of all remaining power. The remaining power, $P_{residual}$, is allocated to effectively increase the multicast rate. A goal is to allocate one more bit to the user which has the lowest bit rate, $R_k$. The method is executed until there is not enough $P_{residual}$ to load one more bit to the chosen sub-channel.

Let $\Delta P_n(c)$ denote the additional power needed to load one more bit to the sub-channel n $$\Delta P_n(c) = \frac{f(c+1) - f(c)}{\overline{h}_{n,k}^2}$$

The power allocation (bit loading) portion of the method of the present invention is as follows:

1) Initialization
  a) Given $A_n$ and $\overline{A}_k$ for all n and k from the sub-channel allocation portion of the method of the present invention
  b) Find $$c_n = \min_{k \in A_n} b_{n,k}$$

for all n.

c) Find $$\overline{h}_n^2 = \min_{k \in A_n} h_{n,k}^2$$

d) Find $$P_{residual} = \sum \left( P_T/N - \frac{f(c_n, BER)}{\overline{h}_n^2} \right)$$

e) Compute $\Delta P_n(c_n)$ for all n.

2) Bit Loading (Power Allocation) Iteration
  a) Find $$k^* = \arg\min_k R_k$$

b) Find $$n^* = \arg\min_{n \in \overline{A}_{k^*}} \Delta P_n(c_n) \text{ and } c_{n^*} \neq M$$

c) If $\Delta P_{n^*}(c_{n^*}) > P_{residual}$, STOP the method
  d) Set $P_{residual} = P_{residual} - \Delta P_{n^*}(c_{n^*})$
     Set $c_{n^*} = c_{n^*} + 1$. If $c_{n^*} = M$, set $\Delta P_{n^*}(c_{n^*}) = \infty$
  e) Repeat sub-steps a) through d) of step 2 until method stops.

Figure 2:
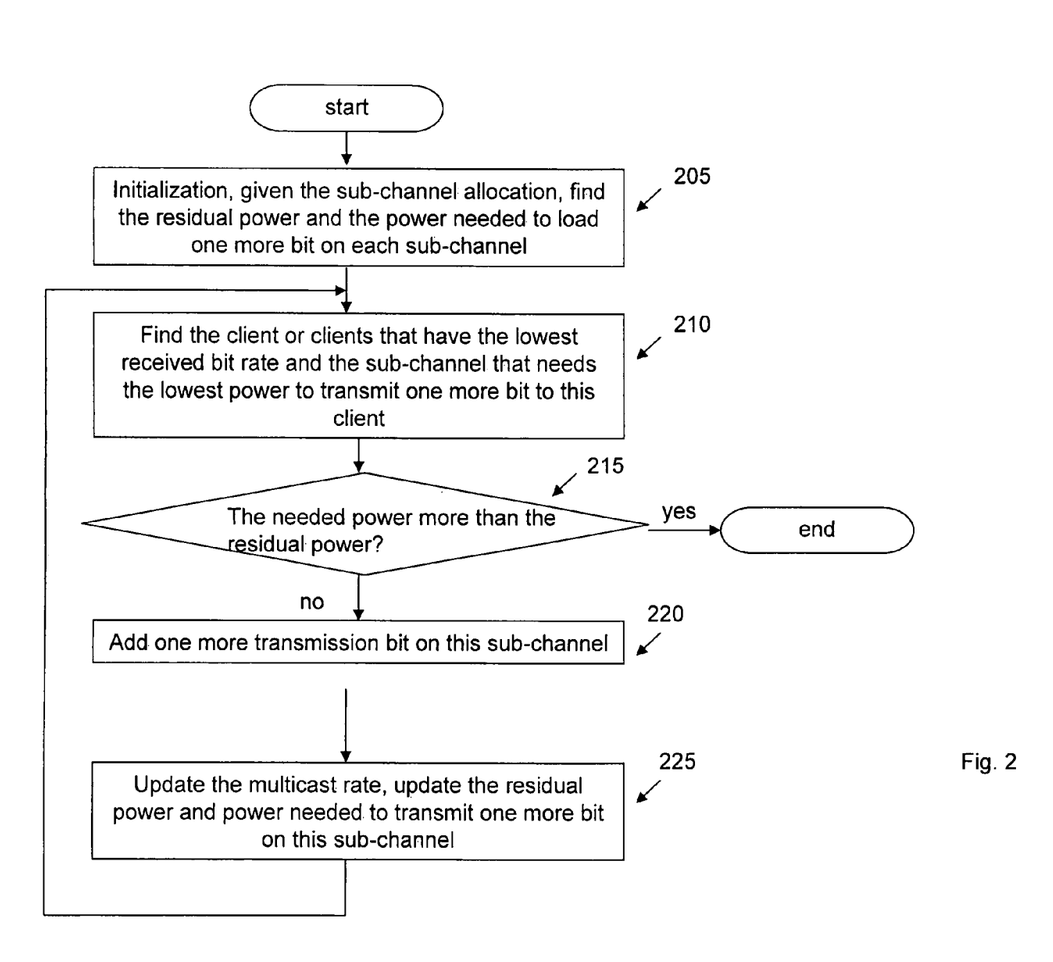
FIG. 2 is a flowchart of the power allocation (bit loading) portion of the method of the present invention.

FIG. 2 is a flowchart of the power allocation (bit loading) portion of the method of the present invention. At 205 the power allocation (bit loading) portion of the method of the present invention is initialized. Given the sub-channel allocation configuration/realization that was determined using the method of FIG. 1, determine/calculate the residual power and the power needed/necessary to load one more bit on each sub-channel. At 210, the client or clients that have the lowest received bit rate and the sub-channel that needs the lowest power to transmit one more bit to this client/these clients are located/found/determined. A test is performed at 215 to determine if the power needed to load one more bit is greater than the residual power remaining. If the power needed to load one more bit is less than or equal to the residual power remaining then at 220 one more transmission bit is added to/on this sub-channel. At 225 the multicast rate is updated and the residual power and the power needed to transmit one more bit on this sub-channel are updated, Processing then proceeds to 210. If the power needed to load one more bit is greater than the residual power remaining then processing ends/stops for the power allocation (bit loading) portion of the method of the present invention.

Figure 3:
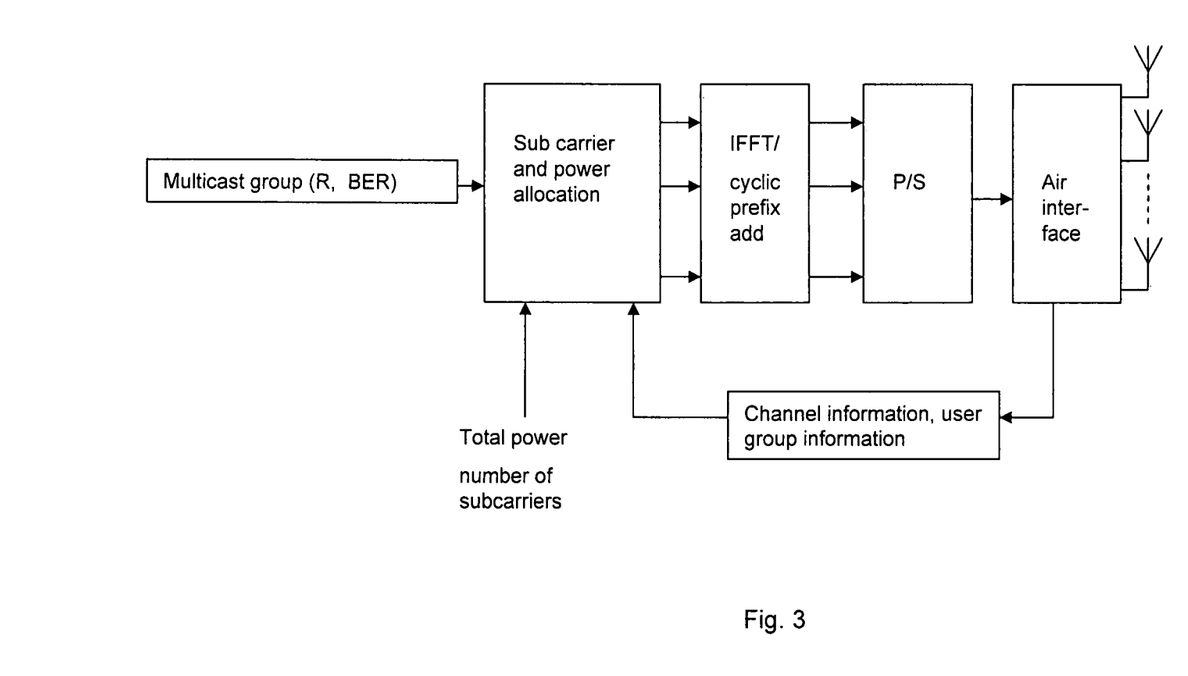
FIG. 3 is a block diagram of a base station of an OFDMA system.

FIG. 3 is a block diagram of a base station of an OFDMA system. The functions of sub-channel allocation and power allocation are performed by the sub-channel and power allocation block. The sub-channel and power allocation block receives data from a multicast group, together with the data rate and quality of service requirement information. The block also receives the sub-channel information and whether a client/user has joined the multicast group from a feedback channel. After the sub-channel allocation and power allocation functions have been performed, the multicast bits and power are assigned to individual sub-channels, the data then passes through an IFFT stage. A cyclic prefix is also added.

The symbols then pass the parallel to serial conversion stage and are transmitted through the air interface.

Figure 4:
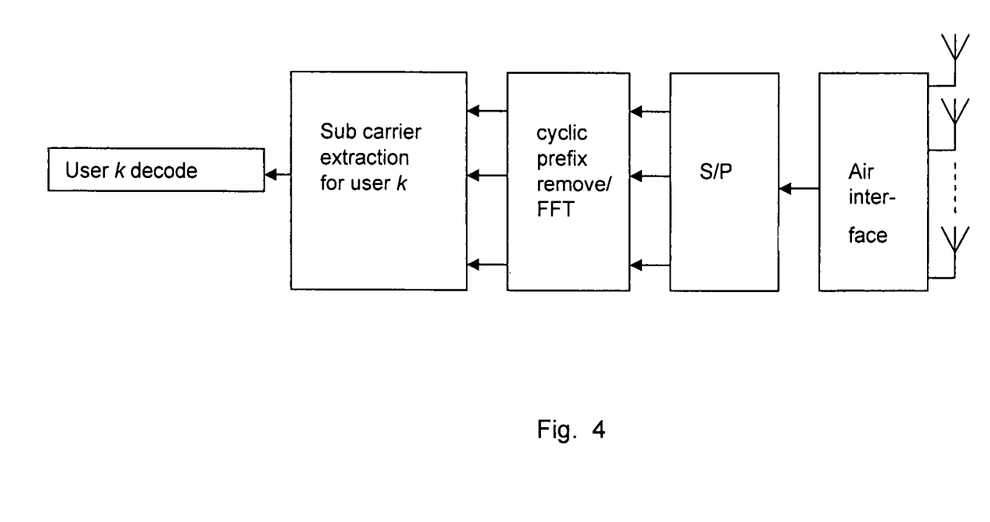
FIG. 4 is a block diagram of a client/user station of an OFDMA system.

FIG. 4 shows a block diagram of a client/user station of an OFDMA system. The majority of the receiving pipeline is the reverse of the transmission pipeline of the base station. It should be noted that the client/user gets information on which sub-channels to listen to from a control channel and decodes the information received on these sub-channels.

A multicarrier multicast network is considered with a Base Station (BS) and G multicast sessions, each multicast session has $K_g$ number of users/clients. The base station has a total power budget of $P_T$. The channel between the base station and users is frequency selective and composed of N sub-channels. N sub-channels are allocated among groups and shared among users in each group.

Let $w_{n,k}$ be a binary indicator showing that whether user k is utilizing the sub-channel n or not, and it is expressed as:

$$w_{n,k} = \begin{cases} 1, & \text{if subchannel } n \text{ is allocated to user } k \\ 0, & \text{otherwise} \end{cases} \quad (13)$$

Also define $\delta_{n,g}$ to be a binary indicator showing that if the sub-channel n is allocated to multicast session g, $$\delta_{n,k} = \begin{cases} 1, & \text{if subchannel } n \text{ is allocated to session } g \\ 0, & \text{otherwise} \end{cases} \quad (14)$$

Let $S^g$ be the set of users in multicast session g. It should be noted that a user can join multiple multicast sessions. The multicast rate of multicast session g, $R^g$ can be expressed as:

$$R^g = \min_{k \in S^g} \sum_{n=1}^{N} c_n w_{n,k} \delta_{n,g} \quad (15)$$

where $c_n$ is the number of bits assigned to the sub-channel n. Assume $c_n$ is chosen from the discrete set $c_n \in C = \{1, 2, \ldots, M\}$. where M is the maximum number of bits that can be transmitted over a single sub-channel.

Each multicast session has a target multicast rate which is $R_T^g$ for multicast session g. A variable $\alpha$ is defined which is the minimum of the ratio of the achievable multicast rate and the target multicast rate of each session.

$$\alpha = \min_g \frac{R^g}{R_T^g} \quad (16)$$

An aspect of the present invention is to maximize the overall throughput of the system. On the other hand, a fair resource allocation has to be considered among multicast sessions. Since $\alpha$ as objective function captures proportional fairness among multicast sessions, $\alpha$ is maximized together with constraints. An optimization problem is formulated as follows, $$\max_{\delta_{n,k}, w_{n,k}, c_n} \alpha \quad (17)$$

subject to:

$$\frac{f(c_n, BER^g) w_{n,k} \delta_{n,g}}{h_{n,k}^2} \leq P_n \quad \forall k, g \quad (18)$$

$$\sum_{n=1}^{N} P_n \leq P_T \quad (19)$$

$$\sum_{g=1}^{G} \delta_{n,g}^g = 1 \quad \forall n \quad (20)$$

Equations (17) to (20) define a nonlinear integer programming problem. In equation (18), $P_n$ is the maximum of powers required to decode $c_n$ bits with bit error rate $BER^g$ of all assigned users in the assigned multicast session. In equation (20), one sub-channel is allowed to be allocated to only one multicast session. In order to solve the optimization problem, a joint sub-channel and bit allocation has to be done. Moreover, sub-channel allocation includes two parts, the sub-channel allocation among multicast sessions, $\delta_{n,g}$, and among users within multicast sessions, $w_{n,k}$. The optimization problem is NP-hard. A greedy method is now proposed that adopts a two step approach, in step 1, sub-channels are allocated among multicast sessions. In step 2, sub-channels and power are allocated to users within each multicast session using the sub-channel and power allocation methods for a single multicast group described above. Then the sub-channel allocation among multicast sessions is adjusted to maximize $\alpha$.

Let $A_n^g$ be the set of users from multicast session g which is assigned to sub-channel n and $D^g$ be the set of sub-channels which are assigned to multicast session g. Define the sets $$A_n^g = \{k | w_{n,k}=1, k \in S^g\} \text{ for } n \in \{1, \ldots, N\}, g \in \{1, \ldots, G\}$$

$$D^g = \{n | \delta_{n,g}=1\} \text{ for } n \in \{1, \ldots, N\}, g \in \{1, \ldots, G\}$$

In step 1, sub-channels are allocated to the multicast sessions. In each multicast session, it is assumed that all sub-channels are allocated to all users in that session, and power is equally allocated to each sub-channel.

Let $\phi(BER,P)$ be the function which evaluates the number of bits that can be received with bit error rate BER and received power P. The function $\phi(BER,P)$ is determined by the modulation type. Let $b_{n,k,g}$ be the number of bits that can be received by user k at sub-channel n in group g. Then, $b_{n,k,g}$ which is an element of the set $\{1, 2, \ldots, M\}$ can be expressed as $$b_{n,k,g} = \min\left(\phi\left(BER^g, \frac{P_T h_{n,k}^2}{N}\right), M\right), k \in S^g$$

The minimum term of the equation ensures that the maximum number of the bits in one sub-channel is not greater than M.

Thus, the number of bits $c_n^g$ in sub-channel n that belongs to the multicast session g and multicast rate $R^g$ of multicast session g can be written as $$c_n^g = \min b_{n,k,g}$$

The following procedure to allocate sub-channels to multicast sessions.

1) Initialization
   a. Set $\delta_{n,g}=0$ for all $n \in \{1, \ldots, N\}, g \in \{1, \ldots, G\}$
   b. Set $D^g=\{\ \}$ and $R^g=0$ 2) While there is a non allocated sub-channel
a) Find $$S = \left\{ g \mid g = \arg\min_{g \in (1, \ldots, G)} (R^g / R_T^g) \right\}$$

if $$|S| > 1, g^* = \arg\max_{g \in S} R_T^g$$

else $g^* = g \in S$
b) Find $$n^* = \arg\max_n c_n^{g^*} \text{ for } n \in \{1, \ldots, N\} \setminus \bigcup_{g=1}^{G} D^g$$

c) Set $\delta_{n^*, g^*} = 1$, $D^{g^*} = D^{g^*} \cup \{n^*\}$, update $R^{g^*}$ The principle of this algorithm is to assign a sub-channel to a multicast session that achieves the highest minimum $b_{n,k,g}$. At each iteration, the multicast session with the lowest proportional rate has the opportunity to choose a sub-channel among all available sub-channels. Note that in this step, it is assumed that sub-channels in each multicast session are allocated to all users within the multicast session. Hence, the sub-channel allocation in this step is suboptimal. On the other hand, this step achieves a coarse fairness among multicast sessions.

Figure 5:
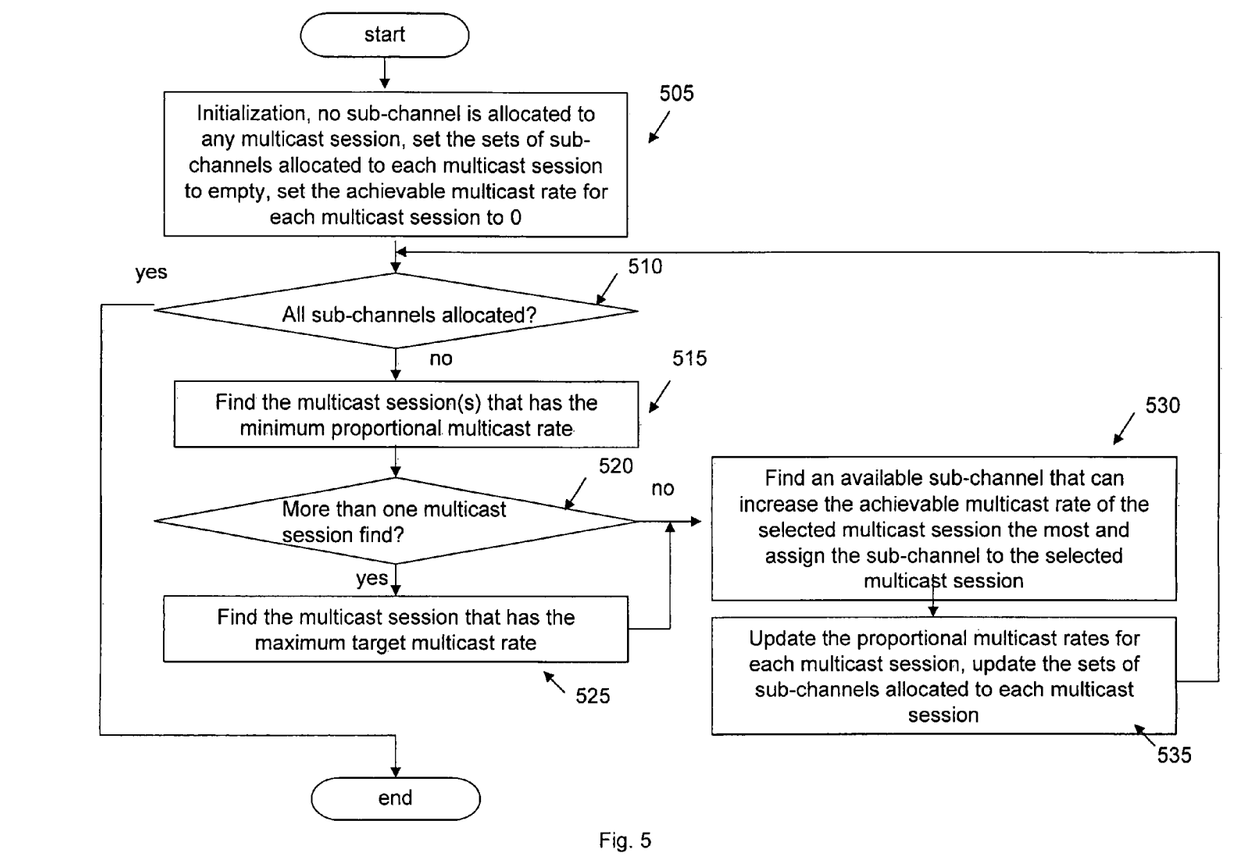
FIG. 5 is a flowchart for allocating sub-channels to multicast sessions.

FIG. 5 is a flowchart for allocating sub-channels to different multicast sessions. At 505 the system is initialized and no sub-channel is allocated to any multicast session. The sets of sub-channels allocated to each multicast session are set to empty (null). The achievable multicast rate for each multicast session is set to 0. A test is performed at 510 to determine if all sub-channels have been allocated to the (multiple) multicast sessions. If all sub-channels have not been allocated to the (multiple) multicast sessions, then at 515 the multicast session is located/found that has the minimum proportional multicast rate. A test is performed at 520 to determine if more than one multicast session was located/found having the same minimum proportional multicast rate. If more than one multicast session was located/found having the same minimum proportional multicast rate, then the multicast session (between the more than one multicast sessions that were found having the same minimum proportional multicast rate) having the maximum target multicast rate is located/found. If only one multicast session was located having a minimum multicast rate or if multiple multicast sessions were located and a multicast session with a maximum target multicast rate was located then at 530 an available sub-channel that can increase the achievable multicast rate of the selected multicast session the most (if found) is assigned to the selected multicast session. At 535 the proportional multicast rate is updated for each multicast session and the sets of sub-channels allocated to each multicast session are also updated. If all sub-channels have been allocated to the (multiple) multicast sessions, then processing ends.

In the second step, sub-channel allocations among multicast sessions are modified depending on the sub-channel and power allocation within each multicast session. Within each multicast session, sub-channels are allocated to users and power is allocated to sub-channels using the methods described above for a single multicast session. As the result of sub-channel and power allocation in each multicast group, the proportional multicast rates of different multicast sessions increase by different amounts. For the multicast session that has the highest proportional multicast rate, the sub-channel which makes the least contribution to the multicast rate is identified and is allocated to the multicast session that has the lowest proportional multicast rate. This process for sub-channel allocation among multicast sessions is performed until no further improvement in $\alpha$ is gained.

Figure 6:
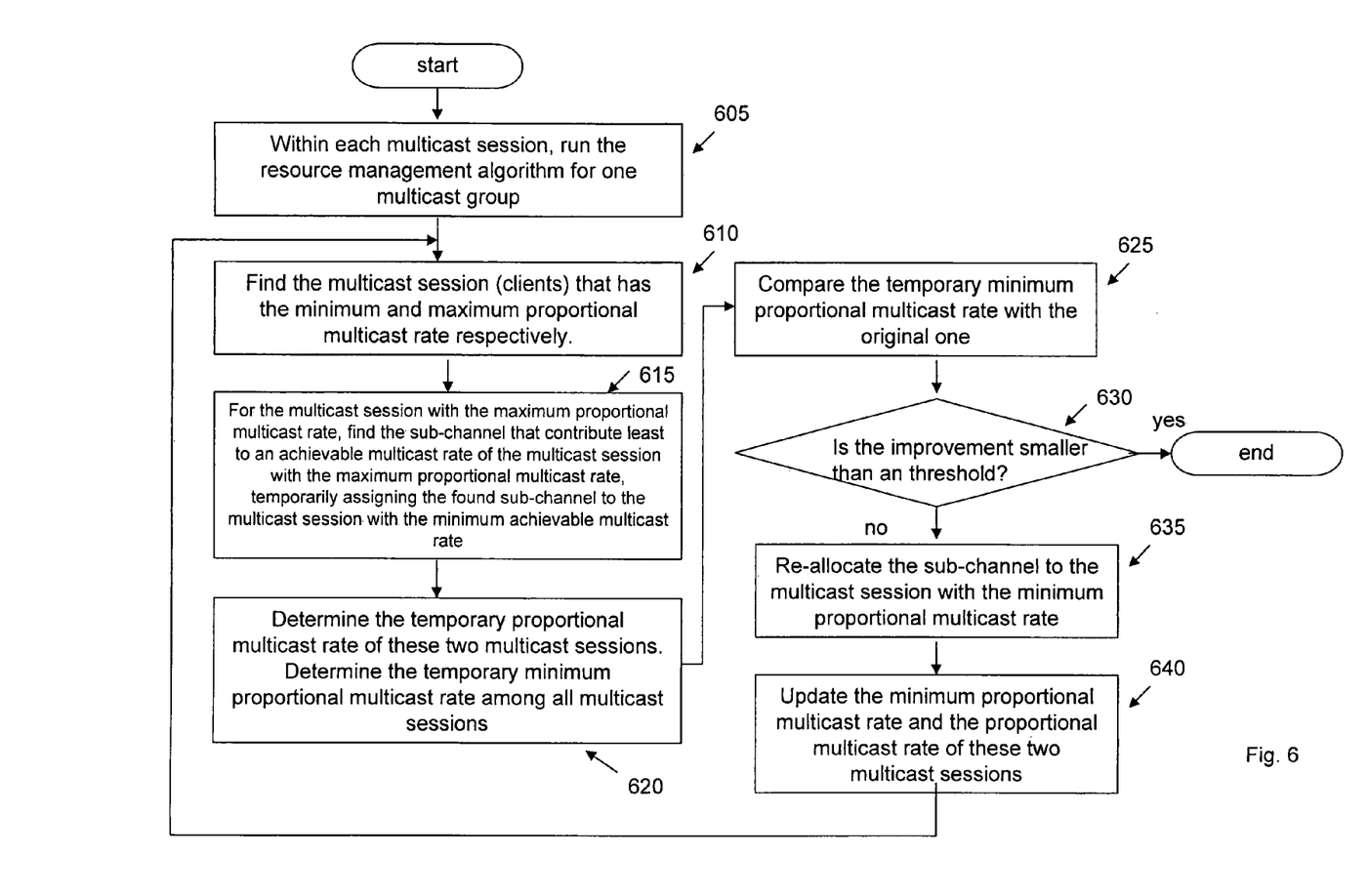
FIG. 6 is a flowchart for adjusting sub-channel allocation among multicast sessions.

Step 2 is described as follows:
1) Given $D^g$, find $A_n^g$ and $R^g$ by the resource management method for a single multicast group.
2) Iteration
a. Find $$\alpha = g^{min} = \arg\min_g R^g / R_T^g \text{ and } g^{max} = \arg\max_g R^g / R_T^g$$

b. In multicast session $g^{max}$, find sub-channel n* that contributes the least to the multicast rate $R^{g^{max}}$. This can be achieved by deleting each channel from the set of sub-channels that is allocated to this multicast session, using the resource management method for a singe multicast session to calculate the multicast rate that can be achieved based on the remaining/rest of the sub-channels.
c. Temporarily allocate sub-channel n* to multicast session $g^{min}$
d. Re-calculate the temporary proportional multicast rate that can be achieved for multicast sessions $g^{min}$ and $g^{max}$. Set the smaller one of the two to $\beta$.
e. If $\beta - \alpha$ is smaller than a certain threshold, STOP.
Else set $D^{g^{min}} = D^{g^{min}} \cup \{n^*\}$ and $D^{g^{max}} = D^{g^{max}} \setminus \{n^*\}$, update $R^{g^{min}}$ and $R^{g^{max}}$.
f) repeat the above starting at 2a FIG. 6 is the flow chart for adjusting sub-channel allocation among multicast sessions. For each multicast session determined in accordance with the method described above and shown in FIG. 5, execute the sub-channel and power allocation methods described above and shown in FIGS. 1 and 2. At 610, locate/find the multicast session (clients) that has the minimum and maximum proportional multicast rates respectively. At 615 for the multicast session with the maximum proportional multicast rate, locate/find the sub-channel that contributes least to an achievable multicast rate of this multicast session with the maximum proportional multicast rate and temporarily assign the found sub-channel to the multicast session with the minimum achievable multicast rate. At 620 temporary proportional multicast rates of these two multicast sessions the multicast session having the minimum proportional multicast rate and the multicast session having the maximum proportional multicast rate are determined. A temporary minimum proportional multicast rate among all multicast sessions is then determined. At 625, a comparison is made between the temporary minimum proportional multicast rate and the original multicast rate (before the sub-channel switch at 615). A test is performed at 630 to determine if the improvement is less than a threshold. If the improvement is greater than the threshold, then at 635 the sub-channel is re-allocated to the multicast session with the minimum proportional multicast rate. At 640 the minimum proportional multicast rate of the multicast session having the minimum proportional multicast rate and the maximum proportional multicast rate of the multicast session having the maximum proportional multicast rate are updated. If the improvement is less than a threshold, then processing ends after the temporary rates are reversed (the temporary rates are not made permanent).

Figure 7:
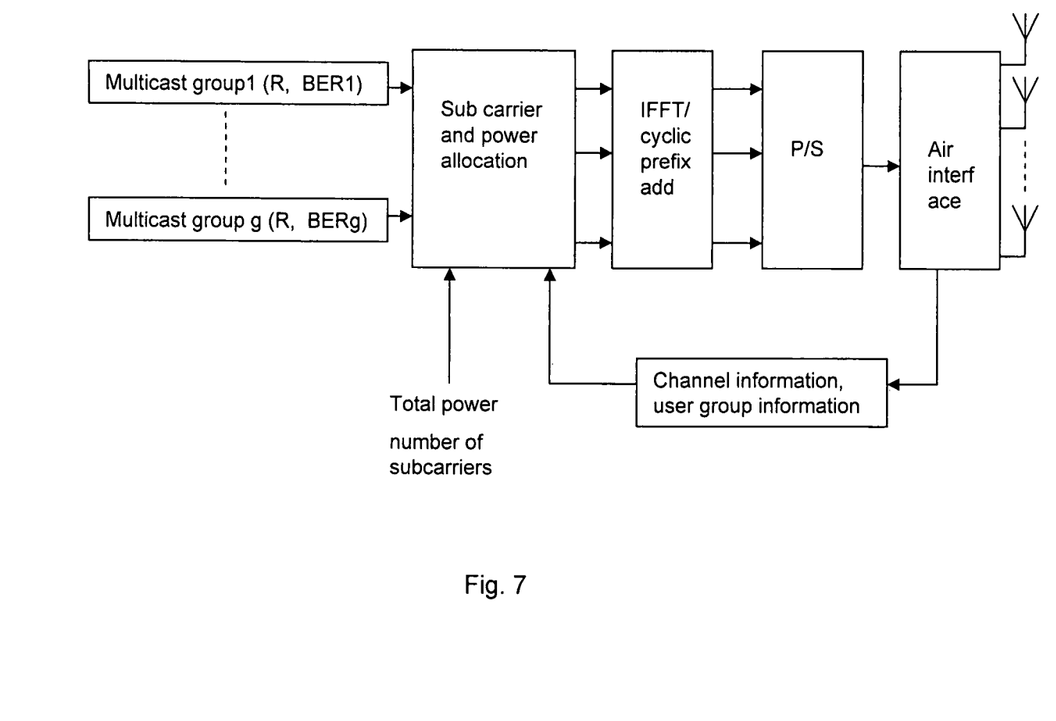
FIG. 7 is a block diagram of a base station of an OFDMA system.

FIG. 7 is a block diagram of a base station of an OFDMA system. The function of sub-channel and power allocation is performed by the sub-channel and power allocation block. The sub-channel and power allocation block gets data from multicast groups, together with the data rate and quality of service information. The sub0channel and power allocation block also gets the sub-channel information and whether a client/user has joined the multicast group from a feedback channel. After the sub-channel and power allocation, the multicast bits and power are assigned to individual sub-channels. The data then passes through IFFT stage. A cyclic prefix is also added and the symbols then pass the parallel-to-serial conversion stage and are transmitted through the air interface.

It is to be understood that the present invention may be implemented in various forms of hardware (e.g. ASIC chip), software, firmware, special purpose processors, or a combination thereof, for example, within a server, an intermediate device (such as a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method performed by a base station apparatus, said method comprising:
   selecting one of a plurality of multicast sessions having a minimum proportional multicast rate;
   allocating, by the base station apparatus, one of a plurality of sub-channels to one of a plurality of multicast group clients for said selected multicast session;
   performing, by the base station apparatus, bit loading for said allocated sub-channel;
   repeating said allocating and performing acts for each of said plurality of multicast sessions; and
   adjusting said sub-channel allocation responsive to said allocating act and said bit loading, wherein said adjusting act further comprises:
   finding the multicast session and multicast group clients having a minimum of a ratio of an achievable multicast rate and a target multicast rate;
   finding the multicast session and multicast group clients having the maximum proportional multicast rate;
   finding, for the multicast session with the maximum proportional multicast rate, the sub-channel of said plurality of sub-channels that contributes least to the achievable multicast rate for the multicast session with the maximum proportional multicast rate and temporarily assigning the found sub-channel to the multicast session with a minimum achievable multicast rate;
   determining a temporary proportional minimum multicast rate for the multicast session having a minimum of the ratio of an achievable multicast rate and a target multicast rate and a temporary proportional maximum multicast rate for the multicast session having the maximum proportional multicast rate;
   determining a temporary minimum of a ratio of an achievable multicast rate and a target multicast rate among all multicast sessions;
   comparing the temporary minimum of a ratio of an achievable multicast rate and a target multicast rate with said minimum proportional multicast rate;
   comparing any improvement between said temporary minimum proportional multicast rate and said minimum of a ratio of an achievable multicast rate and a target multicast rate to a threshold;
   allocating said sub-channel to said multicast session having said minimum of a ratio of an achievable multicast rate and a target multicast rate if said improvement is less than said threshold; and
   updating said minimum of a ratio of an achievable multicast rate and a target multicast rate of the multicast session having the minimum of a ratio of an achievable multicast rate and a target multicast rate and updating said maximum proportional multicast rate of the multicast session having the maximum proportional multicast rate.

2. The method according to claim 1, wherein said selecting act further comprises:
   determining if more than one multicast session of said plurality of multicast sessions has the minimum of a ratio of an achievable multicast rate and a target multicast rate;
   finding a multicast session of said plurality of multicast sessions having a maximum target multicast rate responsive to said determining act;
   finding an available sub-channel that can increase the achievable multicast rate of the selected multicast session a greatest amount and assigning said available sub-channel to said selected multicast session;
   updating said minimum of a ratio of an achievable multicast rate and a target multicast rate for each multicast session; and
   updating a set of sub-channels allocated to each multicast session.

3. The method according to claim 1, further comprising:
   initializing an achievable multicast rate; and
   initializing said sub-channel to multicast session allocations.

4. An apparatus comprising:
   means for selecting one of a plurality of multicast sessions having a minimum proportional multicast rate;
   means for allocating one of a plurality of sub-channels to one of a plurality of multicast group clients for said selected multicast session;
   means for performing bit loading for said allocated sub-channel;

means for repeating said allocating and performing acts for each of said plurality of multicast sessions; and means for adjusting said sub-channel allocation responsive to said allocating means and said bit loading wherein said adjusting means further comprises:

means for finding the multicast session and multicast group clients having a minimum of a ratio of an achievable multicast rate and a target multicast rate;

means for finding the multicast session and multicast group clients having the maximum proportional multicast rate;

means for finding, for the multicast session with the maximum proportional multicast rate, the sub-channel of said plurality of sub-channels that contributes least to the achievable multicast rate for the multicast session with the maximum proportional multicast rate and temporarily assigning the found sub-channel to the multicast session with a minimum achievable multicast rate;

means for determining a temporary proportional minimum multicast rate for the multicast session having the minimum proportional multicast rate and a temporary proportional maximum multicast rate for the multicast session having the maximum proportional multicast rate;

means for determining a temporary minimum proportional multicast rate among all multicast session;

means for comparing the temporary minimum proportional multicast rate with said minimum proportional multicast rate;

means for comparing any improvement between said temporary minimum proportional multicast rate and said minimum proportional multicast rate to a threshold;

means for allocating said sub-channel to said multicast session having said minimum proportional multicast rate if said improvement is less than said threshold; and means for updating said minimum proportional multicast rate of the multicast session having the minimum proportional multicast rate and updating said maximum proportional multicast rate of the multicast session having the maximum proportional multicast rate.

5. The apparatus according to claim 4, wherein said selecting means further comprises:

means for determining if more than one multicast session of said plurality of multicast sessions has the minimum proportional multicast rate;

means for finding a multicast session of said plurality of multicast sessions having a maximum target multicast rate responsive to said determining act;

means for finding an available sub-channel that can increase the achievable multicast rate of the selected multicast session a greatest amount and assigning said available sub-channel to said selected multicast session;

means for updating said minimum proportional multicast rate for each multicast session; and means for updating a set of sub-channels allocated to each multicast session.

6. The apparatus according to claim 4, further comprising:
means for initializing an achievable multicast rate; and
means for initializing said sub-channel to multicast session allocations.

* * * * *